United States Patent Office 2,752,020
Patented June 26, 1956

2,752,020

REMOTE CONTROL SYSTEMS FOR MECHANICAL TRANSMISSION GEARS

Léon Saives, Billancourt, France, assignor to Regie Nationale des Usines Renault, Billancourt, France Application May 27, 1952, Serial No. 290,366

Claims priority, application France August 3, 1951

7 Claims. (Cl. 192—.092)

This invention relates to remote control systems for mechanical transmission gears and is concerned more particularly with an arrangement for controlling the change of speed of several driving units which makes it possible to change speed at will simultaneously on all the driving units or successively on different groups of driving units. These driving units or the groups of driving units may, for example, drive rail or road vehicles.

The invention is particularly applicable to rail cars driven by internal combustion motors and permits the interconnection of several cars or several power units of one car so that all may be operated and controlled from a single control point as in the case of electric rail cars. Each of the power units comprises an engine, a clutch and a change-speed transmission. This control system permits the shifting of the several power units successively so that one or more of the units continues to supply power while another or others are being shifted. The advantage of this arrangement is to avoid cutting out completely the driving force on all the driving units during the operation of gear changing. As each unit is separate from the others, the units may be shifted individually even though all are mounted on the same car or same train of cars. When a unit is shifted up, the speed of the engine of that unit is reduced so that the output speed of the transmission is the same as that of the other units.

This control system comprises essentially a gear-change lever which is displaceable in a grid and a lever for controlling the fuel supply of the engines. The invention comprises auxiliary apparatus for each driving unit of which the control may be different, a servo-motor repeating the movements of the gear-change lever and a combination of electric relays and electro-magnetic valves producing automatically on the differently controlled units the same sequence of controls and in the same order as on the unretarded units, but with a time displacement which is determined in advance.

Figure 1:
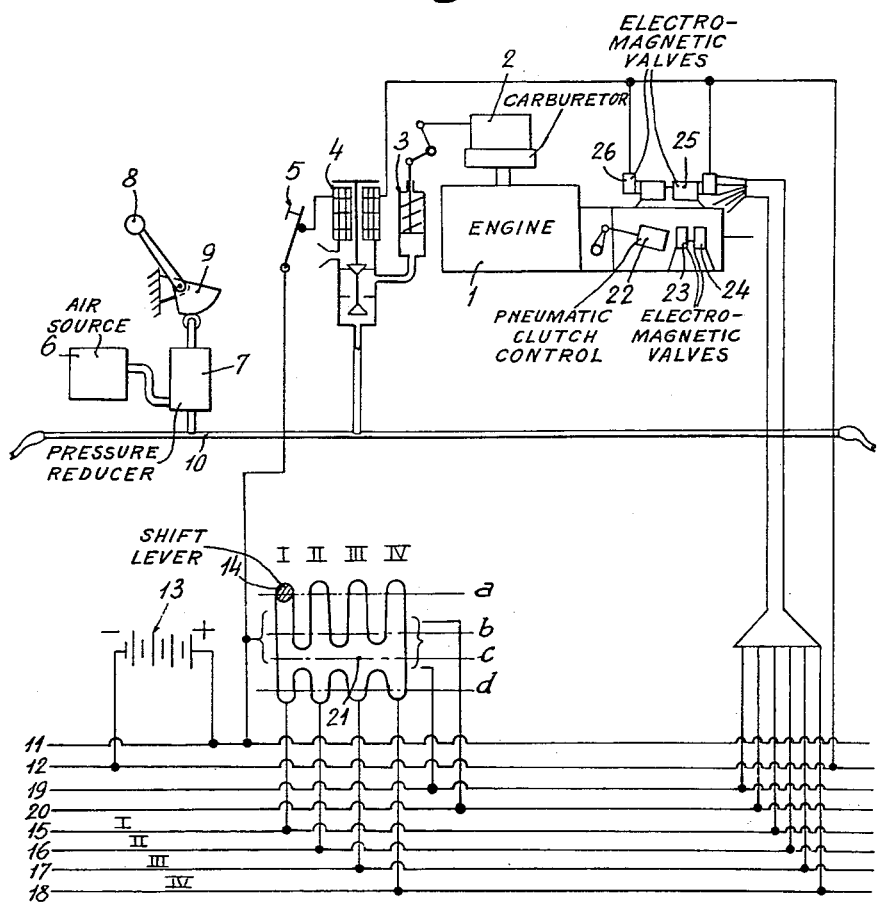
Fig. 1 is a diagrammatic view showing, by way of example, a single power unit of a system in accordance with the invention.

The system shown in Fig. 1 is adapted to control driving units having four speeds and operates in the following manner:

*1. Control of the engine.*—The engine 1 is supplied by a member 2 (carburetor, injection pump, rheostat, etc.), controlled by a cylinder 3 receiving compressed air through an electro-magnetic valve 4 controlled by a switch 5. The compressed air is supplied from a source 6 and passes through a pressure reducer 7 controlled by a lever 8 operating a cam 9. The expanded air passes through a pipe 10 and through the electro-magnetic valve 4 and reaches the cylinder 3. The supply of the engine is thus a function of the air pressure. The electro-magnetic valve supplied from a source of current 13 by means of the switch 5 renders it possible, by cutting off its supply, to isolate the cylinder 3 and consequently to stop the engine 1 by interrupting its supply. The pipe 10 may be common to several engines.

Figure 3:
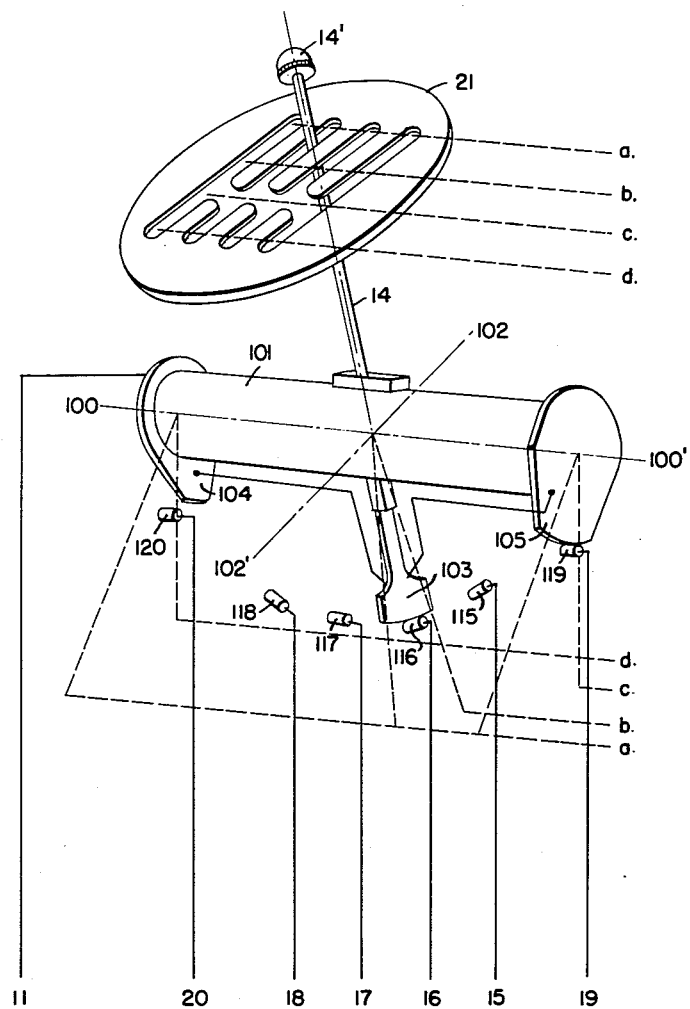
Fig. 3 is an enlarged schematic perspective view showing in more detail the arrangement of the control lever and associated contacts of Fig. 1.

*2. Control of the de-clutching operation and the gear changing operation.*—Disposed at the control position is a lever 14 which can be shifted in a grid 21. The stop positions of the lever 14 are at the intersections of the axes I, II, III, IV, with the axes a, b, c, d. In accordance with known practice, the lever 14 actuates associated electrical contacts to establish electrical paths as below described. An example of a suitable control unit is illustrated schematically in Fig. 3. The unit comprises a cylinder 101 rotatable on an axis 100—100' and having at its opposite extremities two contacts in the shape of cams 104 and 105 both permanently connected by the lead 11 to the positive pole of the source 13 (Fig. 1). Lever 14 extends transversely of the cylinder 101 and is pivotally connected to the cylinder to swing about an axis 102—102' perpendicular to the lever 14 and to the cylinder axis 100—100'. The upper portion of the lever 14 extends upwardly through the grid 21 and is provided with a handle 14'. It will be seen that movement of the lever 14 in the grid 21 along axis I or a parallel axis produces rotation of the cylinder 101 about its axis 100—100'. At its lower end, the lever 14 carries a contact 103 permanently connected to wire 11. A series of contacts 115, 116, 117 and 118 connected respectively with wires 15, 16, 17 and 18 are positioned so as to be selectively engaged by the contact 103 when the lever 14 is on one of the axes I, II, etc. and on intersection axis a or b. A contact 119 connected with wire 19 is positioned to be engaged by cam 105, the profile of the cam being such that it engages the contact 119 only when the lever 14 is on the axes a, b or c. A contact 120 connected with the line 20 is positioned to be engaged by the cam 104, the profile of the cam being such as to engage the contact 120 only when the lever 14 is on the axis a of grid 21.

De-clutching is obtained by supplying compressed air to a cylinder 22 by means of two electro-magnetic valves 23, 24 energized by wires 19 and 20, in accordance with an arrangement which is known and does not require further description.

It is sufficient to mention that the clutch is engaged when the wires 19 and 20 are simultaneously energized or when they are simultaneously without current. When the wire 20 alone is without current while the wire 19 remains energized, this causes de-clutching.

For the positions of the lever 14 on the axis a, the wire 20 is energized. The wire 19 is energized when the lever 14 is on the axes a, b, c and de-energized at d; the wire 20 is de-energized at b, c, d.

The clutch is thus engaged for the positions at a and d and it is dis-engaged at b and c.

The gear ratios are engaged by compressed air servomotors which are supplied in accordance with a known arrangement by electroc-magnetic valves 26 energized by wires 15, 16, 17 and 18 corresponding to the speeds I, II, III, IV.

The first speed is engaged when the lever 14 is positioned at Ia and b.

The second speed is engaged at IIa and b, the third at IIIa and b and the fourth at IVa and b.

The wires 11 and 12 corresponding to the positive and negative terminals of the source of electricity 13, and also the wires 15, 16, 17, 18, 19 and 20 inter-communicate between all the units to be controlled.

In order to pass, for example, from the gear ratio I to the gear ratio II, the lever 14 is first of all moved from position I*a* to I*b*, which disengages the clutch, the gear I remaining in mesh. The lever is then moved to I*c*, which places the gear I in the neutral position and the engine is completely uncoupled. The lever is then moved to II*d*, which engages the clutch, the gear box still being in neutral. It is then possible, by accelerating or slowing down the engine, to synchronize the main shaft of the gear box with the new speed II. The lever is then moved to II*c*, which disengages the clutch, and then to II*b*, which engages the speed II (still de-clutched), and then to II*a*, which engages the clutch.

The invention is applicable to the arrangement which has just been described and renders it possible to control at will for the change of the gear ratios to be effected simultaneously at all the driving units or only instantaneously on certain of these units, while the others are changed with a delay which is determined in advance, in such manner as to carry out the change on the retarded units only when the change of the other units has been completed.

Figure 2:
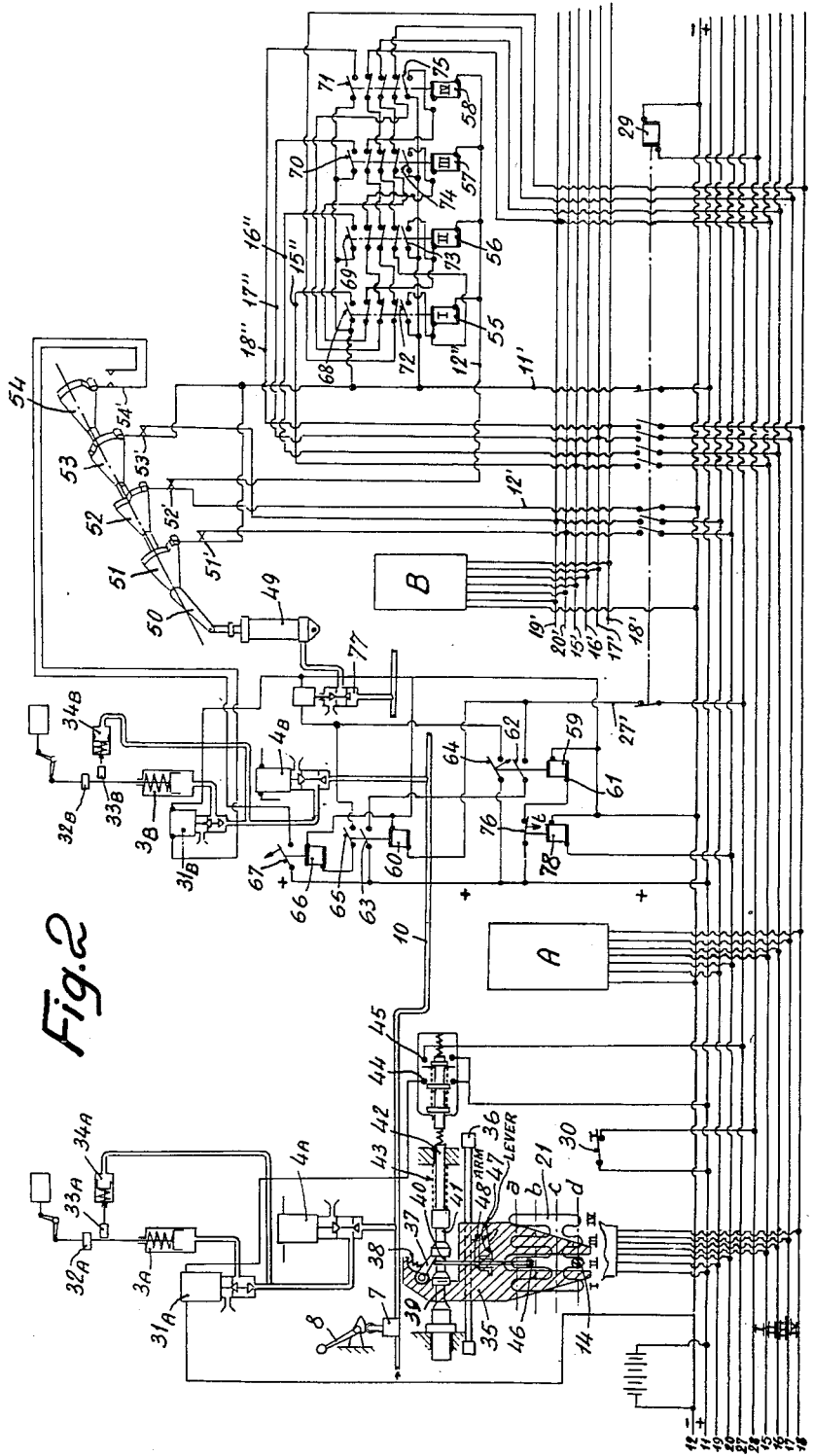
Fig. 2 is a diagrammatic view showing, by way of example, a control system in accordance with the invention for two power units A and B.

Figure 2 shows by way of example, but without being of any limitative nature, the complete diagram of the subject of the invention as adapted to the control system hereinbefore described.

A are the units which are directly controlled and B are the units which may be controlled either directly or with a predetermined delay; Figure 2 shows one each of these units.

The intercommunicating wires 11, 12, 19, 20, 15, 16, 17, 18 of Figure 1 are also shown in Figure 2. Figure 2 also shows the wire 28 controlling the meshing or unmeshing of the retarded control and a wire 27 controlling the feed to the units which are capable of being retarded.

The units A are connected directly to the wires 12, 19, 20, 15, 16, 17, 18, but the elements B are connected to a second group of wires 19', 20', 15', 16', 17', 18'. The current return from B may without disadvantage be permanently connected to the wire 12.

When a relay 29 controlled by a switch 30 is not energized, it connects the wires 19', 20', 15', 16', 17', 18', with the wires 19, 20, 15, 16, 17, 18, and breaks the connection between 11' and 12' with the current supply and return wires 11 and 12 and between 27 and 27'. The unit B is then subjected directly to the control from the driving position without any time lag. The supply of the engine of the unit B is then carried out as for the engine of the unit A through the air pipe 10 by means of a lever 8 operating the pressure reducer 7.

The retarded control of the unit B is rendered operative by closing the switch 30 to energize 29 which then occupies the position shown in Figure 2.

The control of the engine of unit B is then carried out automatically during the gear-changing operation, the lever 8 not being operated by the driver.

The control of the unit A is effected directly by the lever 14 being displaced in the grid 21 as described. A special device actuated by the lever 14 is provided to control the slowing down of the engines when passing to a higher speed and in order not to change its supply in any way when passing to a lower speed.

The control of the engines is always effected respectively by cylinders 3A and 3B which are connected to pipe 10 through isolating electro-magnetic valves 4A and 4B, and electro-magnetic valves 31A and 31B which, when energized by the throttling control, shut off the supply of air from the pipe 10 and connect the cylinders 3A and 3B to atmosphere. The pistons of the cylinders 3A and 3B thereupon descend under the action of their springs, and collars 32A and 32B on the piston rods bear on stops 33A and 33B which are moved by pistons 34A and 34B which are subjected to the pressure of the air in the pipe 10. The stops 33A and 33B are regulated to determine the throttled supply to the engines.

In order to stop the engines, it is sufficient to bring the pressure in the pipe 10 to zero. The stops 33A and 33B are moved to the right in Fig. 2 and the pistons of the cylinders 3A and 3B fall to zero.

The arrangement for throttling the engines comprises a fork 35 in which the lever 14 is adapted to move. This fork is movable transversely, for example, by sliding on a rod 36; it carries a pawl 37 which is acted upon by a spring 38 and which engages in saw-tooth recesses 39, 40, 41 carried by a rod 42 moved towards the left by a spring 43. The rod 42 is urged towards the right each time the gear-changing lever 14 is moved into a slot which is more to the right and which corresponds to a higher speed; it then closes contacts 44 and 45, one of which (44) immediately operates the retarding electro-magnetic valve 31A and the other sets the throttling retard control device of the unit B which will be hereinafter described.

The throttling is thus produced from the moment the lever has passed along the line *c* from one slot of the grid to the next slot towards the right and remains operative when the lever 14 passes along the line *d*. During this time, the synchronizing arrangement is operated. This occurs when the lever 14 has passed the line *b* (engagement of the new speed) and when it has passed along the line *a* (re-engagement of clutch) which, by operating on the rod 46, releases the pawl 37 which enables the rod 42 to return toward the left and to break the contacts 44 and 45. The engine A then immediately reassumes its supply determined by the control device 8. The engine B will be subject to its throttling effect despite the breaking of the contact 45, as will hereinafter be explained.

It is seen that when engaging a lower speed, the fork 35 is displaced towards the left and the throttling control is not operated because the pawl is not effective in this direction.

With direct control, the pawl 37 is permanently lifted by means of a lever 47 which keeps a rod 46 raised by means of an arm 48 secured to this rod and which then occupies the position shown in dotted lines. It is thus possible to combine the movement of the switch 30 with that of the lever 47 and possibly also with an arrangement for lifting the fork 37 in order to disengage it from the lever 14. It is also possible to provide a switch on the supply line of the retarding electro-magnetic valve 31A.

The arrangement for automatically controlling the unit B comprises a servo-motor 49 constituted by a cylinder and piston, the rod of which operates a lever 50 keyed to a shaft carrying four cams 51, 52, 53, 54 operating switches 51', 52', 53', 54' connected as shown.

The cylinder of the servo-motor 49 is supplied with compressed air by an electro-magnetic valve 77. A spring moves the piston in a downward direction when the cylinder of the servo-motor 49 is connected to atmosphere.

The function of the servo-motor 49 and associated cams is to reproduce, for the unit B, the movements of the lever 14 in the direction from *a* to *d* or from *d* to *a*.

The speed of the lifting movement of the lever 50 is adapted to be adjusted by a valve having a diaphragm and arranged on the supply line for the air to the cylinder of the servo-motor 49.

It is seen that in the lifting movement of the lever 50 caused by the servo-motor 49 upon energization of the electromagnetic valve 77, there is successively produced:

1. The interruption of the supply of the wire 20' by the cam 51 to disengage the clutch of unit B and at the same time the energization by the cam 54 of the retarding electro-magnetic valve 31B to the extent which the contacts 45 has set this control in advance.

2. The interruption by the cam 52 of the current return line 12" of the relays 55, 56, 57, 58 for preselecting the speeds of the unit B and which will be later described.

The speed change gear of unit B is placed in neutral position.

3. The interruption by the cam 53 of the supply to the line 19', which re-engages the clutch of unit B.

The synchronizing device of unit B is then operated.

The delayed relays hereinafter described then operate to interrupt the supply of current to the electro-magnetic valve 77. The piston of the servo-motor 49 then descends again with a speed regulated by a diaphragm on the exhaust side of the valve 77. The following steps then occur in succession:

1. The line 19' is supplied with current again through the cam 53—this causes disengagement of the clutch of unit B.

2. The re-connection by means of cam 52 of the current return of the pre-selection relays 55, 56, 57, 58, resulting in the movement to the new speed in the unit B.

3. The re-supply by cam 51 of current to the line 20', with the result that the clutch in unit B is re-engaged, and interruption by cam 54 of the current to the retarding electro-magnetic valve 31B.

The relays controlling the servo-motor 49 and the throttle arrangement of the unit B are shown in Fig. 2 as four in number.

A relay 78 controlled by the line 20 is of the retarded opening type. A blade 76 connects the positive line 11 with the terminal 61 of a relay 59. The latter is provided with two closing blades, one of which (62) immediately responds to the energization and connects line 27' with a blade 63 of a relay 60 and with the positive line 11 if the relay 60 is energized by the retard line 27' supplied with current by the contact 45; the other responds to the energization with an adjustable retardation and supplies the current on the one hand to the electro-magnetic valve 77 for controlling the servo-motor and on the other hand to a blade 65 of the relay 60 supplying a relay 66 which, by attracting a blade 67, supplies current to the throttle control contact operated by the cam 54.

The blade of relay 66 opens with delay on de-energization.

The operation of the four relays 78, 59, 60, 66 is as follows:

When units A and B are at the same speed, relay 78 is energized and its blade 76 interrupts the current to the relay 59 which is de-energized; relays 60 and 66 are also thus de-energized.

If the speed is changed, the lever 14 first of all cuts out the wire 20. The blade 76 drops immediately and provides current exciting the relay 59. The blade 62 closes its contact which will serve as holding relay for the relay 60 when it will have eventually been excited by the line of the throttling control.

The blade 64 will close its contact at the end of an adjustable time which is of such a nature that this closing only takes place after the engagement of the new speed by the unit A. At this moment, the current will be fed to the electro-magnetic valve 77 and to the blade 65. The servo-motor 49 thus completes its movement.

If the lever 14 is moved to a lower speed, relay 60 will not be energized and the throttling control in the unit B will not operate. If, on the contrary, the contact 45 has been established by engaging a higher speed, the relay 60 is energized by line 27' and its two blades 63 and 65 are immediately attracted. The blade 63 provides current to the relay 60 by blade 62 being already closed, so that relay 60 forms a holding relay. The relay 60 will thus remain energized even if the contact 45 be de-energized as a result of the return of the lever 14 on the line a. The blade 65 then passes the current to the relay 66 which, by attracting its blade 67, provides the current to the contact 54' controlled by the cam 54 which will regulate accurately the operating time of the throttling member at unit B.

When the lever 14 has completed its operation of changing gear, it will re-establish the flow of current to wire 20 and at this moment the blade 76 will be retracted, but since it has a retarded opening, it will only interrupt the current to the relay 59 at the end of a previously regulated time which is sufficient to permit all the operations in the unit B to be completed. The relay 59 will then be energized and the servo-motor 49 will move back to its starting position but at the same time the current to the relay 60 is interrupted and relay 66 is de-energized. The blade 67 of relay 66 has a retarded opening and it will only open after a previously adjusted time interval in order to permit the servo-motor 49 to carry out its return travel and consequently the cam 54 to complete its function. The assembly of four relays then returns to its starting position corresponding to the engagement of the gears in the units A and B.

The pre-selection and the control of the speeds in unit B is carried out by the four relays 55, 56, 57, 58 which each comprise an upper blade contact 68, 69, 70, 71, the purpose of which is to place the lines 15", 16", 17", 18" which control the electro-magnetic valves of the speeds in the unit B in contact with the current supply line 11'.

The relays 55 to 58 are excited by the interconnecting wires 15, 16, 17, 18 controlled directly by the lever 14. The line controlling any one of the relays 55 to 58 passes in series through one of the three contact blades between the three others so that the current can only reach this relay if the said other three contacts are de-energized. In addition, each of the relays 55 to 58 carries a lower contact blade 72, 73, 74, 75, forming a holding contact for the energization of each relay when the supply of current is interrupted in the control line 15, 16, 17 or 18.

The operation of this system will now be described, taking as an example the retarded change from the first speed to the second.

1. The lever 14 is positioned at Ia, the first speeds are engaged at units A and B and the relay 55 is energized by the line 15.

2. The lever 14 is moved to Ib, the current is interrupted in the wire 20; the clutch of the unit A is disengaged and the relay system 58, 59, 60 and 66 commences to operate as described above. The servo-motor 49 does not move yet and relay 55 remains energized.

3. The lever 14 is moved to Ic, the current supply to wire 15 is interrupted, the gear box of unit A is shifted to neutral position, the relay 55 remains energized by its holding contact 72 and, since 49 has still not moved, the unit B remains in first gear.

4. The lever 14 is moved to IIc; the double contact 45, 46 engages, the engine of unit A immediately slows down and the lines 27 and 27' are supplied with current. The system of throttling relays 60 and 66 is energized and operates as described above; the servo-motor 49 still does not move, relay 55 remains energized and unit B remains in first gear.

5. The lever 14 is moved to IId, and the current supply is interrupted at wire 19. The clutch of unit A is re-engaged, the gear box remaining in neutral; its engine is still slowed down, servo-motor 49 does not move, relay 55 remains energized and unit B remains in first gear.

6. The lever 14 is moved to IIc; wire 19 is reestablished; the clutch of unit A is disengaged but not the change speed gear at unit B, which remains in first gear.

7. The lever 14 is moved to IIb; the gear box of unit A is shifted to the second gear ratio, the current supply is established in wire 16, but cannot pass to the relay 56 of the second speed in unit B because it is interrupted by relay 55, the three intermediate contact blades of which are lowered. The servo-motor 49 does not move and unit B remains in first gear.

8. The lever 14 is moved to IIa; the current supply is re-established in wire 20; the clutch of unit A is re-engaged and the unit is in second gear. The throttling control of unit A terminates because contacts 44 and 45 are opened. The relay 78 is energized by wire 20, but its retarded contact blade still does not open and thus there is no change in the relays 78, 59, 60 and 66; the servo-motor 49 still does not move and unit B remains in first gear. From now on, the lever 14 does not move any more.

9. The retarded contact blade 64 of relay 59 is lowered and renders the servo-motor 49 operative, which commences by interrupting the current supply on wire 20' by the cam 51; the clutch of unit B is disengaged and the cam 54 causes the engine of unit B to idle until the servo-motor 49 returns to its rest position. The relay 55 is still energized and the gear box of unit B is declutched for the first time.

10. The cam 52 interrupts the return current of the four relays 55 to 58 through the line 12"; the four relays drop; unit B assumes the unclutched neutral position.

11. The cam 53 interrupts the current supply in wire 19'; the clutch of unit B is re-engaged and while the gear is still in neutral and synchronization is produced in unit B, the engine of which slows down.

12. The retarded contact blade 76 of relay 78 interrupts the supply of current to relay 59, then blade 62 interrupts the supply of current to the relay 60 and blade 64 interrupts the supply of current to relay 55. The relays 60 and 66 are de-energized, but the contact blade 67 which opens with delay maintains the current supply to the contact of the cam 54. The engine remains throttled down. The servo-motor 49 commences its return movement. Unit B is still in the clutched neutral position.

13. The cam 53 re-establishes the current supply at wire 19', the clutch of unit B is disengaged and the gear box of unit B remains in the neutral position.

14. The cam 52 re-establishes the return current supply line 12" of the relays 55, 56, 57, 58. As the line 16 of the second speed is energized, the current from line 16 may reach relay 56 because the other relays are de-energized. Unit B is shifted to second speed because its electro-magnetic valve is energized by the line 16" which is supplied with current by the blade contact 69; unit B is thus in second gear with the clutch disengaged.

15. The cam 51 restores the current in line 20'; the clutch of unit B is re-engaged and at the same time the cam 54 interrupts the supply of current to the idling electro-magnetic valve 31B. Unit B is then in second gear with the clutch engaged and the engine reassumes its normal speed.

16. The retarding contact blade 67 is opened and the complete system is returned to the original condition. The two units A and B operate normally in second gear.

The same procedure will take place when passing from any one of the gears to another.

It is seen that the fork 35 only permits travel to an adjacent gear stage. However, without departing from the invention, it would be possible to design the rod 42 in such manner that it actuates the contacts 44 and 45 for any displacement towards the right, thus making it possible to jump one or two gear stages if this is desired.

Without departing from the scope of the invention, it will be possible to dispense with the stops 33A and 33B and their cylinders if the idling time of the engines is sufficiently long for there is no danger of jamming before the change of speed has been carried out.

Conversely, if the normal idling time of the engine is too long, it will be possible for an idling brake of the engine of unit B and a brake of the engine of unit A to be controlled by the same cam 54 and by the contact 44 at the same time as the retarding electro-magnetic valves 31B and 31A, for example, by 31B and 31A having arranged in parallel therewith electro-magnetic valves which send compressed air into the cylinders of the retarding brakes of any known type.

It would also be possible to cause the slowing down by interrupting the supply of current in the isolating electro-magnetic valves 4A and 4B and to dispense with the electro-magnetic valves 31A and 31B.

It would also be possible, without departing from the invention, to add contact blades to the relays 55 to 58 for the possible control of different circuits.

Furthermore, the servo-motor 49 could be of an electric or hydraulic type instead of a compressed air type, and be set in operation by a series of relays in accordance with a conventional arrangement.

The carrying into effect of the arrangements forming the subject of the invention have been described, by way of example, and without being of any limiting character, for an existing control system.

It is also obvious that the system: servomotor, relays 78, 59, 60, 66, electro-magnetic valves 31B, 77, relays 55, 56, 57, 58 and 29 may be common to several units B or even be repeated for each unit according to convenience of installation.

It is possible to have several units A in parallel on the same control group and 31A may be common to several engines or be repeated by providing one for each engine A.

I claim:

1. In a power transmission, particularly for motor driven vehicles, a plurality of driving units, at least one driven unit, a transmission unit connecting each of said driving units with the driven unit, each of said transmission units comprising a clutch and gears providing a plurality of speed ratios, means for actuating the clutch and shifting the gears of one transmission unit, means for automatically actuating the clutch and shifting the gears of a second transmission unit in like manner, and a delay relay interposed between said transmission units to delay the actuation of the clutch and the shifting of the gears of said second transmission unit so that the speed change of said second transmission unit occurs after that of the first mentioned transmission unit.

2. In a power transmission, particularly for motor driven vehicles, a plurality of driving units, at least one driven unit, a transmission unit connecting each of said driving units with the driven unit, each of said transmission units providing a plurality of speed ratios and comprising a clutch for disconnecting the respective driving unit from the driven unit, means for actuating one transmission unit to disengage the clutch, change speed ratio and reengage the clutch, means for automatically actuating a second transmission unit in like manner to disengage the clutch, change speed ratio and reengage the clutch, and an eelctrical control circuit for said automatic actuating means including a delay relay to delay the cycle of actuation of said second transmission unit so that the clutch of said second transmission unit is disengaged only after the clutch of the first mentioned transmission unit has been reengaged.

3. In a power transmission, particularly for motor driven vehicles, a plurality of driving units, at least one driven unit, a transmission unit connecting each of said driving units with the driven unit, each of said transmission units providing a plurality of speed ratios and comprising a clutch for disconnecting the respective driving unit from the driven unit, an electro-pneumatic control system for actuating each of said transmission units through a predetermined shifting cycle which comprises disengaging the clutch, shifting from one speed ratio to another and reengaging the clutch, and electrical connections between the control systems of two transmission units including a delay relay to delay the shifting cycle of one transmission unit until the shifting of another transmission unit has been completed and the clutch of the last mentioned transmission unit has been reengaged.

4. In a power transmission according to claim 3, means for slowing down each of said driving units when shifting up from a lower to a higher gear ratio.

5. In a power transmission, particularly for motor driven vehicles, a plurality of driving units, at least one driven unit, a transmission unit connecting each of said driving units with the driven unit, each of said transmission units providing a plurality of speed ratios and comprising a clutch for disconnecting the respective driving unit from the driven unit, an electro-pneumatic control system for actuating each of said transmission units through a shifting cycle which comprises disengaging the clutch, shifting from one speed ratio to another and re-engaging the clutch, manual control means connected with said control systems to initiate a shifting cycle and a delay relay connected between said manual control means and at least one of said control systems to delay the shifting cycle of the respective transmission unit until the shifting cycle of another transmission unit has been completed.

6. In a system for remotely controlling a plurality of power units from a single control station, each of said units comprising a variable speed motor, a clutch and a multiple speed transmission, electrically controlled means for varying the speed of the motor, actuating the clutch and shifting the transmission of each unit, a first control system comprising a control lever at said station movable in a first direction between a plurality of operative positions and movable in a second direction transverse to the first between a plurality of positions corresponding to different speed ratios of said transmission, electrical contacts actuated by the movement of said lever and electrical circuits connecting said contact with a power supply and with said electrically controlled means of a first unit in the manner that movement of said lever in said first direction from an initial operative position successively actuates said means to disengage the clutch of said first unit, shift the transmission of said unit to neutral and re-engage the clutch, while movement of said lever in said second direction shifts the transmission of said first unit from one speed to another and return movement of said lever in the reverse of said first direction reengages the clutch of said unit, a second control system for the electrically controlled means of a second unit, said second control system comprising a series of cams, a servo-motor for moving said cams, a series of switches operable by said cams, electrical connections between said switches and said electrically controlled means of said second unit, said switches, cams and connections actuating said means of the second unit in the same sequence as said means of the first unit, and delayed action means controlled by said first control system to initiate the operation of said servo-motor of the second control system with a predetermined delay after the operation of said first control system.

7. A system according to claim 6, further comprising a fork engageable by said lever and movable by movement of said lever in said second direction, first circuit means controlling said motor speed varying means of the first unit including contacts actuated by movement of said fork when said lever is moved in a direction to shift said unit to a higher speed to reduce the speed of said motor, second circuit means controlling said motor speed varying means of said second unit to reduce the speed of the motor of said second unit, and delayed action means for initiating the operation of said second circuit means after the operation of said first circuit means.

References Cited in the file of this patent

UNITED STATES PATENTS

| | | |
|---|---|---|
| 2,283,133 | Allen | May 12, 1942 |
| 2,294,823 | Andres | Sept. 1, 1942 |
| 2,326,911 | Aikman | Aug. 17, 1943 |
| 2,397,883 | Peterson | Apr. 2, 1946 |
| 2,568,958 | Hey | Sept. 25, 1951 |
| 2,622,711 | Chambonneau | Dec. 23, 1952 |

FOREIGN PATENTS

| | | |
|---|---|---|
| 631,665 | Great Britain | Nov. 8, 1949 |